United States Patent [19]

Yadegar et al.

[11] Patent Number: 4,671,334

[45] Date of Patent: Jun. 9, 1987

[54] VEHICULAR SUNSHADE

[76] Inventors: George Yadegar; Parvaneh Y. Aframian, both of 10330 Oakdale Ave., Chatsworth, Calif. 91311

[21] Appl. No.: 841,204

[22] Filed: Mar. 19, 1986

[51] Int. Cl.⁴ .............................................. A47H 5/00
[52] U.S. Cl. ................................. 160/84 R; 296/97 E
[58] Field of Search ................. 160/84 R, 107, 229 R, 160/DIG. 2, DIG. 3, DIG. 4, 368 S; 296/97 E, 97 R, 97 A, 97 C, 97 D; 248/174

[56] References Cited

U.S. PATENT DOCUMENTS

| | | | |
|---|---|---|---|
| 1,168,343 | 1/1916 | Smith | 160/84 R |
| 1,307,437 | 6/1919 | Curry | 160/220 |
| 1,944,696 | 1/1934 | Reichl | 160/231 R |
| 2,979,129 | 4/1961 | Ketchum | 160/368 S |
| 3,003,812 | 10/1961 | Haugland | 296/97 E |
| 3,164,350 | 1/1965 | Taub | 248/174 |
| 4,202,396 | 5/1980 | Levy | 160/84 R X |
| 4,560,245 | 12/1985 | Sarver | 160/DIG. 3 X |
| 4,606,572 | 8/1986 | Maguire | 296/97 E X |

Primary Examiner—Robert W. Gibson, Jr.
Assistant Examiner—Sarah Lechok Eley
Attorney, Agent, or Firm—Christie, Parker & Hale

[57] ABSTRACT

A collapsible sunshade is set forth having longitudinal and lateral dimensions to, when deployed, block the rays of the sun. The sunshade has a plurality of lateral folds defining panels which are foldable about the folds in an accordion-like fashion to collapse the sunshade toward a longitudinally intermediate lateral fold creating a pair of side-by-side panel packs. To further collapse the sunshade, each panel has a longitudinal fold, the longitudinal folds being nested together in the packs. Each pack is foldable about the nested longitudinal folds to further collapse the sunshade.

9 Claims, 5 Drawing Figures

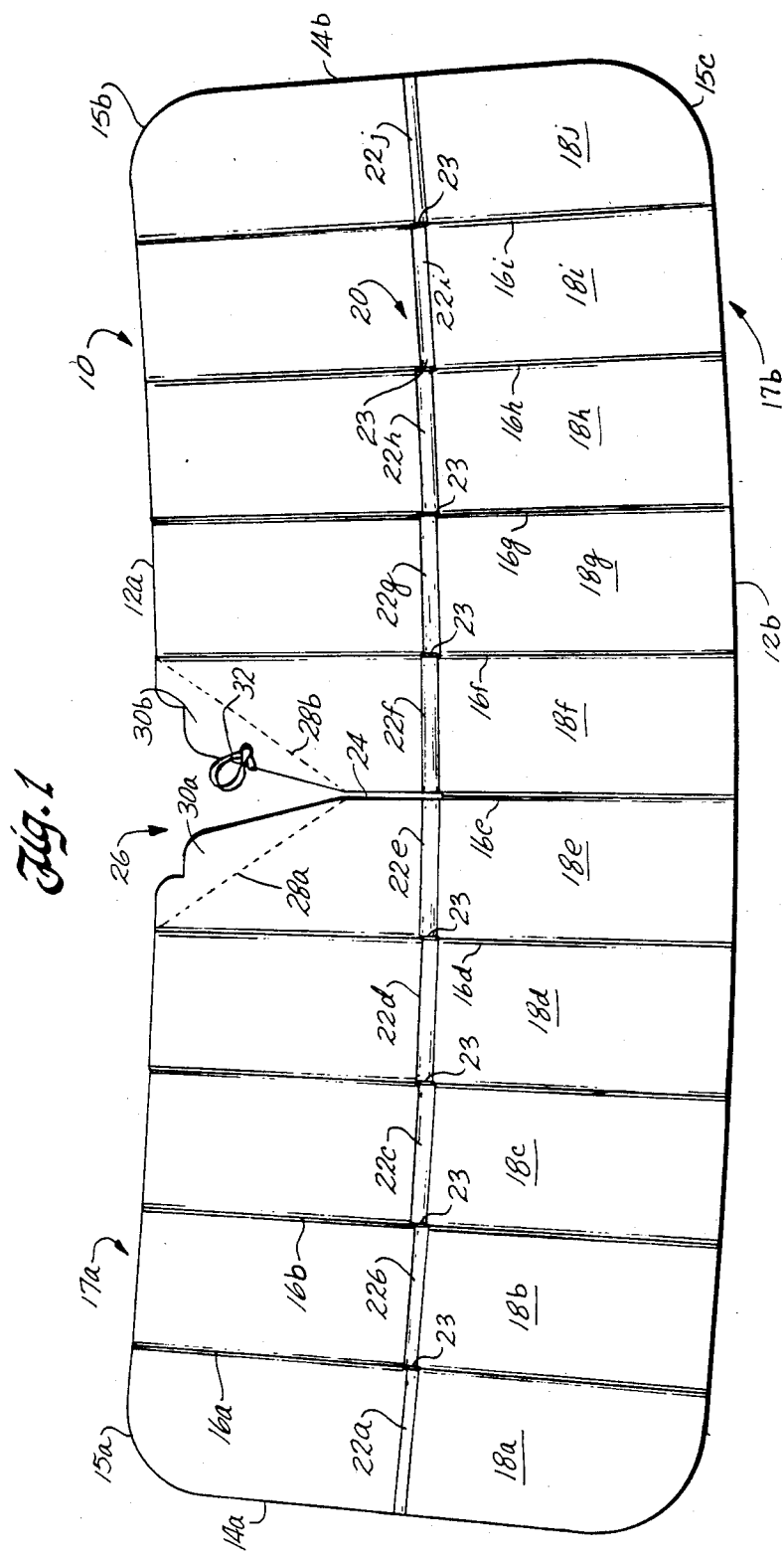

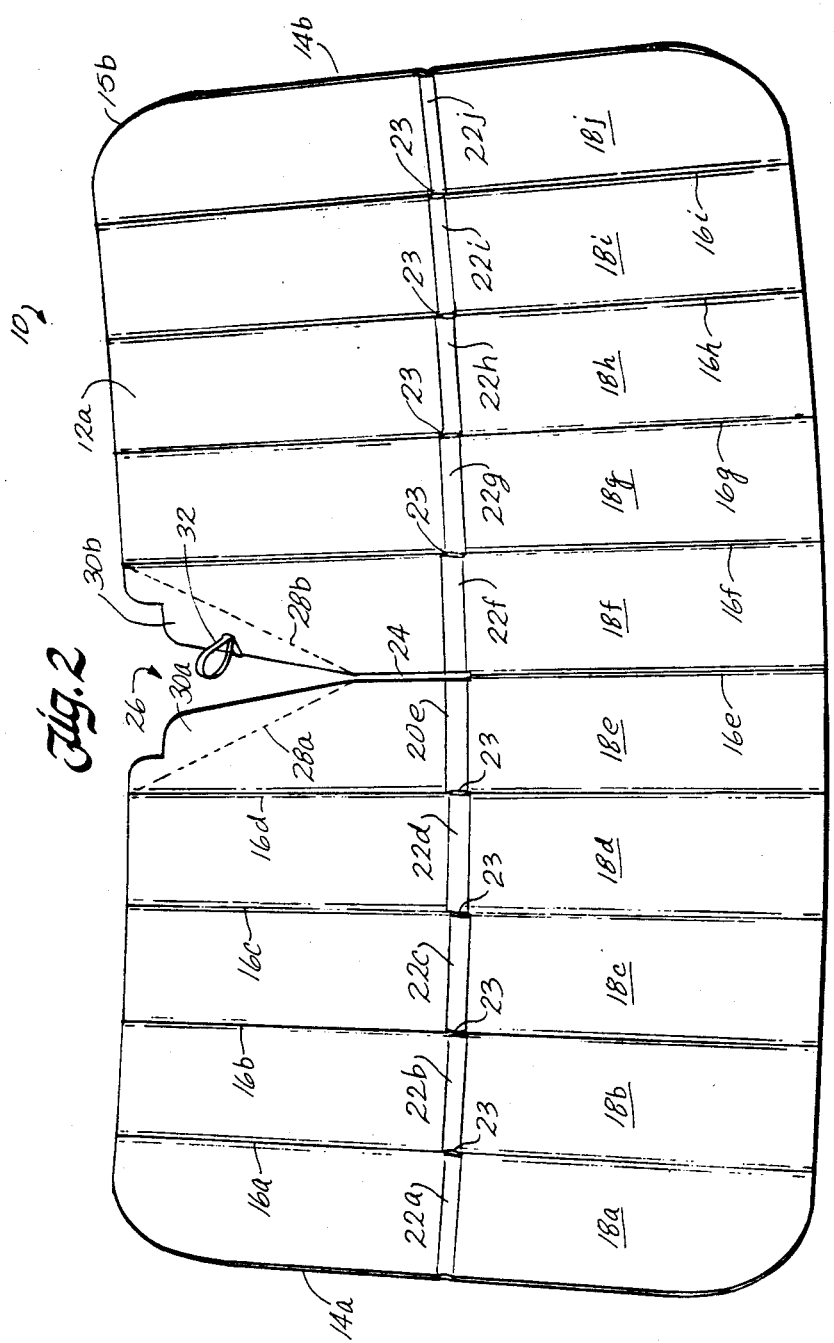

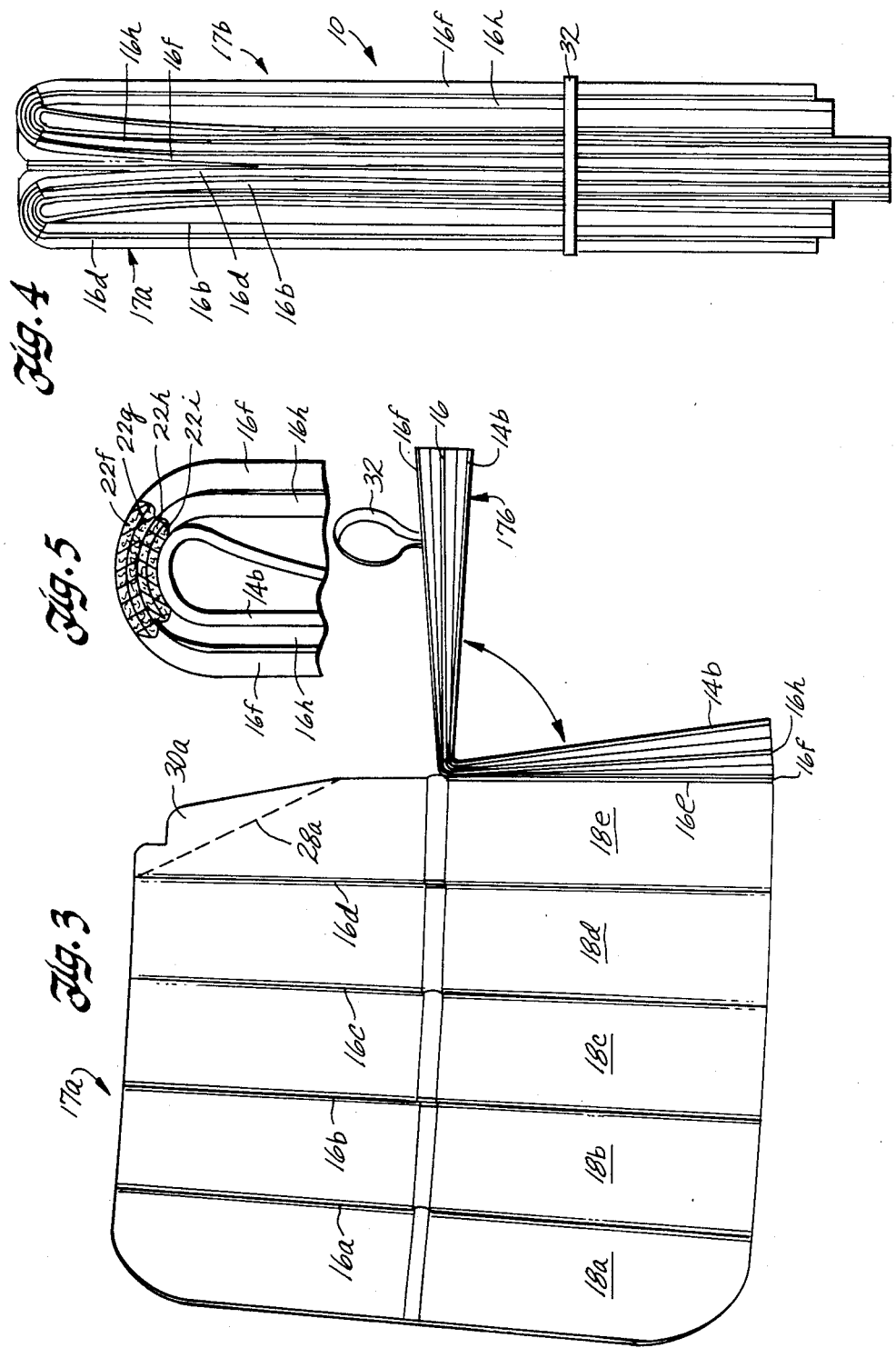

VEHICULAR SUNSHADE

FIELD OF THE INVENTION

This invention relates to vehicle sunshades which prevent the rays of the sun from penetrating into the vehicle interior.

BACKGROUND OF THE INVENTION

It is well known that the rays of the sun which penetrate vehicle windows can have a damaging effect on the upholstery and other components or packages therein. With the windows closed for security of the vehicle, the rays of the sun beating on to the vehicle raise the temperatures of the vehicle interior to high levels. Combined with the bleaching action of the rays of the sun, materials such as leather, vinyl or the like tend to fade, rot, crack or become brittle, or otherwise damaged thereby. The same holds true for other plastic components commonly found in modern vehicles.

In an attempt to block the rays of the sun from penetrating the vehicle, various devices have been used. For example, in Levy, U.S. Pat. No. 4,202,396, a vehicle sunshade is disclosed which is adapted to be fixed between the vehicle dashboard and the upper margin of the vehicle front windshield. When extended, the sunshade substantially expands over the interior extent of the windshield and is opaque to block the rays of the sun from encountering the components of the interior. For storage, the sunshade is provided with laterally extending folds defining rectangular elements which can be folded together in an accordion-like fashion about the folds to a collapsed state.

A problem with the Levy type of sunshade is that when in the collapsed position defining what will hereinafter become referred to as "a pack", at least one dimension of the pack is defined by the lateral extent of the window. Hence, if the front window has a large bottom-to-top dimension the folded sunshade pack also having that dimension will likewise be large. As a result, easy use and storage of the sunshade have been frustrated. The only convenient places in which the sunshade pack can be stored are in the back seat, rear window ledge or trunk necessitating that the driver retrieve the pack from these remote locations for use. Storage in the front seat or glove compartment, which would certainly be more convenient, is out of the question based upon the elongate dimension of the pack.

SUMMARY OF THE INVENTION

There is, therefore, provided in the practice of the present invention a vehicular sunshade which is adapted to be collapsed into a small package which can easily be retained at the front seat or in the glove compartment.

Toward this end, a collapsible sunshade for a vehicle window is set forth, the sunshade having a lateral and longitudinal dimension when in the extended state to block the rays of the sun from passing through the vehicle windshield. The sunshade includes a plurality of lateral folds defining panels foldable in a panel superimposed, accordion-like fashion about the folds toward a longitudinally intermediate lateral fold to collapse the sunshade into an intermediate position defining adjoining first and second panel packs. To provide for the further collapse of the sunshade into a package defined by a smaller envelope, the sunshade further includes a longitudinal fold line cutting intermediately across the panels and a slit extending from one longitudinal side margin to the longitudinal fold line, the first and second packs foldable in opposite directions about the intermediate longitudinal fold to further collapse the sunshade. Preferably, the longitudinal fold line is somewhat discontinuous defined by individual folds at each panel which are laterally offset with respect to adjacent panels to prevent the longitudinal fold line from defining a continuous line of weakening for the sunshade. Still more particularly, the lateral dimensions of the longitudinal folds of panels adjacent the intermediate lateral fold are greater than those out panels remote from said intermediate lateral fold.

In use, in the extended position, the sunshade is adapted to span the window, for example, an automobile front windshield, the sunshade held at its bottom margin at the dashboard and at the top margin by the rearview mirror or vehicle shade flaps. Since the longitudinal folds are offset, the sunshade has sufficient vertical rigidity so as not to be self-collapsing. When it is desired to store the sunshade, it is removed from the windsheld and folded about the lateral folds toward the longitudinal intermediate lateral fold defining a pair of companion first and second panel packs. Thereafter, the packs are folded away from the slit about the longitudinal fold lines to the ultimate collapsed state which is sufficiently small so as to enable the sunshade to be conveniently kept at the front seat or stored in the glove compartment.

Since the sunshade can be folded into a small package, storage and hence use of the sunshade is facilitated. If desired, emergency or commercial messages may be imprinted on the sunshade to be displayed when it is deployed.

BRIEF DESCRIPTION OF THE DRAWINGS

These and other features and advantages of the present invention will become appreciated as the same becomes better understood with reference to the specification, claims and drawings wherein:

FIG. 1 is a front view of the sunshade laid flat according to the present invention;

FIG. 2 is a front view of the sunshade according to the present invention in a semi-folded or deployed state adapted to be retained at the windshield of the vehicle;

FIG. 3 is a front view of the sunshade according to the present invention with one side thereof shown partially collapsed;

FIG. 4 is a front view of the sunshade according to the present invention in the ultimate collapsed package for storage; and FIG. 5 is an enlarged view of the arrangement of the longitudinal folds of the collapsed sunshade of FIG. 4 illustrating the nesting thereof.

DETAILED DESCRIPTION

Turning to the drawings, a sunshade 10 according to the present invention is shown. With reference to FIG. 1, the sunshade 10 is shown laid flat to illustrate the various features thereof. It is to be understood, however, that when deployed at a vehicle windshield or the like, the sunshade 10 is semi-folded into, in plan view, an accordion-like configuration to stand between the lower margin, i.e., dashboard of the windshield and the upper margin.

The sunshade 10 when laid flat has an arcuate configuration so that when deployed it will closely match the wrap-around windshields of modern automobiles.

Hence, the sunshade 10 has curved, parallel top and bottom longitudinal margins 12a–b extending between somewhat radial, laterally extending side margins 14a–b. When in the deployed state (FIG. 2), bottom longitudinal margin 12b will rest on the vehicle dashboard, longitudinal margin 12a will be disposed proximate the upper terminus of the front window and side margins 14a–b will be disposed proximate the side edges of the windshield thereby enabling the sunshade 10 to prevent the rays of the sun which pass through the windshield from encountering the upholstery and other interior components of the vehicle. To reflect the rays of the sun and keep the vehicle interior cool, the sunshade may be made reflective or of a light color. In those areas of the country where it may be desirable to solar heat the vehicle interior in the winter, the sunshade could also be colored black or the like to act as a collector. While the sunshade could be fashioned from products such as plastic, fiberboard, cardboard or the like, E-flute board has been found to be preferable. Rounded corners 15a–d may be provided where the margins join.

To provide for its collapse, the sunshade 10 is provided with a plurality of lateral folds 16a–i which are spaced along the longitudinal dimension and between the side margins 14a–b. Each of the lateral folds 16a–i extends between the longitudinal margins 12a–b defining substantially trapeziform panels 18a–j for the sunshade 10. One of the lateral folds, for example, lateral fold 16e, defines a longitudinally disposed intermediate fold the purposes of which will hereinafter become evident. Intermediate fold 16e divides the sunshade 10 into left and right sunshade portions 17a and 17b respectively.

Each of the lateral folds 16a–i is biased so as to permit adjoining panels to fold with respect to each other in alternating clockwise and counterclockwise directions. For example, viewing the sunshade 10 from above, lateral fold 16a may be biased such that panel 18a is foldable in a counterclockwise direction relative to panel 18b. Lateral fold 16b is biased in the other direction such that panel 18b folds in a clockwise direction relative to panel 18c. Hence, as can be appreciated, by virtue of the bias of the lateral folds 16a–i, the sunshade 10 is adapted to be folded in an accordion-like fashion about the lateral folds 16a–i to a semi-folded or deployed state. In the deployed state, adjacent panels may be arranged orthogonally or obliquely so that the sunshade 10 may be rigidly deployed at the interior of the automobile across the windshield. It can further be appreciated that the panels 18a–j of portions 17a and 17b may be collapsed in an accordion-like fashion to the intermediate fold 16e whereby each of the portions 17a and 17b defines a pair of adjoining "packs" of collapsed panels.

To provide for the further collapse of the sunshade 10, a longitudinal fold 20 is provided. Longitudinal fold 20 is defined by straight panel folds 22a–j each substantially bisecting a panel 18a–j and preferably arranged parallel to the bottom longitudinal margin 12b. To accommodate the curvature of the sunshade 10 and as best shown in FIG. 1, the panel folds 22a–j are laterally offset with respect to adjacent panel folds. For example, panel fold 22e is laterally offset with respect to panel fold 22d which is also laterally offset with respect to panel fold 22c and so forth for portion 17a. For portion 17b, panel fold 22f is offset with respect to panel fold 22g and so forth for the remainder of the panel folds 22h–j. It is believed that by offsetting the panel folds 22a–j with respect to adjacent panel folds, the sunshade 10 is substantially rigid in a deployed state since the longitudinal fold 20 is discontinuous and hence a common, longitudinal extending fold or weakening line is not provided across the sunshade 10.

The panel folds 22a–j are biased to fold in opposite directions. For example, panel fold 22j is adapted to fold the panel 18j in a direction into the paper in FIG. 1, whereas panel fold 22i is biased to fold the panel 18i in a direction out of the paper in FIG. 1. The alternating forward and backward bias of the panel folds continues for each of the shade portions 17a and 17b. Panel folds 22e and 22f, by virtue of the odd number of panels for each portion, are adapted to each fold in the same direction. To enable the panels to be easily folded about the longitudinal fold 20, a plurality of cuts 23 may be provided across the longitudinal fold 20 to separate adjoining panel folds 22a–j.

To accommodate the collapse of the sunshade, the panel folds decrease in their lateral dimension, i.e., vertical dimension in FIG. 1, based upon their distance from the intermediate fold 16e. For example, panel fold 22f preferably has a dimension of ⅝ inches, panel fold 22g has a lateral dimension of 9/16 inches, panel fold 22h has a lateral dimension of ½ inches; panel fold 22i has a lateral dimension of 7/16 inches and panel 22j has a lateral dimension of 5/16 inches. Since the sunshade is symmetrical about intermediate fold 16e the same dimensions hold true, respectively, for panel folds 22e–j.

To provide for the collapse in the manner described hereinafter of the sunshade 10, a slit 24 extends laterally from the top longitudinally margin 12a along intermediate lateral fold 16e, the slit 24 terminating just past the panel folds 22e–f. If desired, a cut-out 26 may also be provided at the top longitudinal margin 12a, preferably symmetrical about the intermediate fold 16e and contoured so as to bear against the forward surface of an automobile rearview mirror when the sunshade 10 is positioned at the windshield.

To enable the sunshade 10 to pass the rearview mirror for deploying or removing the sunshade 10, a pair of converging scores or lines of weakening 28a–b extend from the top longitudinal margin 12a proximate, respectively, the lateral folds 16d–f to the slit 24 thereby defining flaps 30a–b yieldable about the lines of weakening 28a–b to enable the sunshade 10 when in the semi-folded, deployed position to be pushed and pulled past the rearview mirror. In the deployed position, the flaps 30a–b bear against the front (forward facing) surface of the rearview mirror.

With reference to the remaining drawings, FIG. 2 shows the sunshade 10 in the semi-folded, deployed position where the panels 18a–j are arranged in an accordion-like fashion as semi-folded about the defining lateral folds 16a–i. The lower longitudinal margin 12b rests against the dashboard whereas the top longitudinal margin 12a lies proximate the top of the automobile windshield. Side margins 14a–b reside proximate the side margins of the windshield. Flaps 30a–b bear against the front surface of the rearview mirror thereby holding the sunshade in position. If desired, the automobile shades may be pivoted forwardly to likewise maintain the sunshade 10 in position.

When it is desired to collapse the sunshade 10 for storage, the sunshade 10 is removed from the windshield and the panels 18a–j are folded about lateral folds 16a–i in the manner described above toward the intermediate lateral fold 16e. In this position, the sunshade portions 17a-b define folded panel packs joined by the aforesaid intermediate lateral fold 16e. In this position, the panel folds 22a-e are superimposed as are panel folds 22f-j. To further collapse the form, each sunshade portion 17a-b hereafter folded about its superimposed panel folds as clarly illustrated in FIGS. 3 and 4 to define the collapsed pack illustrated in FIG. 4. As shown in FIG. 5, the differing lateral dimensions and offset of the panel folds provides sufficient distance to make the turn to fold the sunshade portions 17a-b with the superimposed panel folds nesting together as clearly illustrated. In the collapsed position, as shown in FIG. 4, both sunshade portions 17a-b have been collapsed about the panel folds and an elastic fastener 32 which may be provided at panel 18f proximate flap 30b is stretched to surround the collapsed sunshade of FIG. 4. To redeploy the sunshade, the fastener 32 is removed and the sunshade 10 is unfolded and deployed.

As can be appreciated, by virtue of the panel folds, the sunshade 10 can be collapsed into a convenient package for storage at the front seat or even in the glove compartment of the automobile or other vehicle. The panel folds are offset and are of different sizes to permit the sunshade 10 to be collapsed in the manner described above.

While we have shown and described certain embodiments of the present invention, it is to be understood that it is subject to many modifications without departing from the spirit and scope of the invention set forth in the claims.

What is claimed is:

1. A collapsible sunshade positionable at a vehicle windshield comprising:
   said sunshade having lateral and longitudinal dimensions defining lateral and longitudinal side margins to block rays of the sun passing through said windshield, said longitudinal margins being arcuate, said sunshade including a plurality of lateral folds extending from one longitudinal margin to the other defining panels foldable in a panel superimposed, accordion-like fashion about said folds toward a longitudinally intermediate lateral fold to collapse said sunshade into an intermediate position defining first and second panel packs, each of said panels having opposed front and rear surfaces and further having a longitudinal fold line disposed substantially midway between said longitudinal side margins and extending entirely across each of said panels, the longitudinal fold lines on the panels on either side of the longitudinally intermediate lateral fold extending in alternatingly different directions with respect to the surfaces of said panels, with said panels on each side of said longitudinally intermediate lateral fold defining mirror images of each other and a slit coextensive with said longitudinally intermediate lateral fold, extending from one longitudinal side margin to said longitudinal fold line, said first and second packs foldable in opposite directions about said longitudinal fold line to further collapse said sunshade.

2. The sunshade of claim 1 wherein the longitudinal fold is discontinuous, each of said panels including a longitudinal panel fold extending between adjacent lateral folds defining said panel.

3. The sunshade of claim 2 wherein the width of the panel folds nearer the intermediate lateral fold is greater than those folds remote from the intermediate fold.

4. The sunshade of claim 2 wherein said sunshade is arcuate in the longitudinal dimension defining curved top and bottom margins and said lateral folds are substantially radial defining trapeziform-shaped panel, said panel folds laterally offset in relation to adjacent panel folds each lying substantially parallel to its panel bottom margin.

5. The sunshade of claim 1 wherein said sunshade is arcuate in the longitudinal dimension having curved top and bottom margins, said panel folds laterally offset in relation to adjacent panel folds each lying substantially parallel to its panel bottom margin.

6. The sunshade of claim 1 further including a cutout having a dimension to accommodate the mount for the automobile rear view mirror, said cutout disposed at an upper margin for the sunshade.

7. The sunshade of claim 6 wherein said cutout is arranged symmetrically about said intermediate lateral fold.

8. The sunshade of claim 6 further including a pair of lines of weakening across said sunshade to define a pair of foldable flaps at each side margin of the cutout, said flaps yieldable to pass the sunshade over the rear view mirror.

9. A collapsible sunshade positionable at a vehicle windshield comprising:
   said sunshade has a lateral and a longitudinal dimension to block rays of the sun passing through said windshield, said sunshade including a plurality of lateral folds defining panels defining top, bottom and side margins foldable in a panel superimposed, accordion-like fashion about said folds to collapse said sunshade and said sunshade is arcuate in the longitudinal dimension defining curved top and bottom margins said top margin of said sunshade being shorter in length than said bottom margin, to conform to the contour of said windshield thereby providing a more secure fit and said lateral folds are substantially radial with respect to said margins defining trapeziform shaped panels wherein said top margins are shorter in length than said bottom margins.

* * * * *